United States Patent Office 2,742,482
Patented Apr. 17, 1956

2,742,482

PURIFICATION PROCESS

Erik V. Heegaard, San Jose, Calif., assignor to International Minerals & Chemical Corporation, a corporation of New York No Drawing. Application November 8, 1951,
Serial No. 255,553

10 Claims. (Cl. 260—326.3)

The present invention relates to a process for recovering purified solutions of pyrrolidone carboxylic acid, and more particularly to a process for the treatment of Steffen's filtrate or similar liquors to recover a purified solution of pyrrolidone carboxylic acid.

Glutamic acid and pyrrolidone carboxylic acid, the lactam of glutamic acid, have been recovered from the hydrolysates of vegetable and animal proteins, as well as from solutions resulting from the desugarization of sugar beet solutions by a method commonly known as the Steffen's process. The partially desugarized solution which results from the Steffen's process is known in the sugar industry as Steffen's filtrate and consists of an aqueous solution containing about 95% by weight of water and about 5% by weight of a complex mixture of organic and inorganic compounds. The inorganic compounds consist mainly of salts of sodium, potassium, and calcium; while the organic compounds include glutamic acid, glutamic acid mother substances, betaine, and minor amounts of other amino acids. Glutamic acid can be recovered from hydrolysates of Steffen's filtrate by crystallization at the isoelectric point of glutamic acid.

U. S. No. 2,434,715 describes the conversion of the glutamic acid present in acidic protein hydrolysates, adjusted to a pH of 3.0, to pyrrolidone carboxylic acid by heating at 125° C. for 4 hours, and the extraction of this lactam from the resulting mixture with ethyl acetate. The pyrrolidone carboxylic acid is recovered from the extract. U. S. Patents No. 2,528,047 and No. 2,510,980 describe a process involving the conversion of glutamine present in sugar beet juice to pyrrolidone carboxylic acid, and the pyrrolidone carboxylic acid is then separated from the juice by adsorption on an anion exchanger after first having removed the cations by contacting the pyrrolidone carboxylic acid containing solution with a cation exchanger. The pyrrolidone carboxylic acid present in the purified solution obtained by employing this process can then be hydrolyzed to glutamic acid. However, these processes are wasteful of glutamic acid values present in the raw material.

It is the object of the instant invention to provide a process for the recovery of a purified solution of pyrrolidone carboxylic acid.

It is a further object of the instant invention to provide an improved process whereby objectionable impurities inherently present in alkali-hydrolyzed Steffen's filtrate may be removed and wherein purified pyrrolidone carboxylic acid or glutamic acid is recovered therefrom.

It is a further object of the instant invention to provide an improved process for the conversion of crude glutamic acid to pyrrolidone carboxylic acid and for the removal of impurities from the pyrrolidone carboxylic acid.

These and other objects will become apparent upon a fuller understanding of the instant novel process as hereinafter described.

It has been found that substantially pure pyrrolidone carboxylic acid can be separated from the other amino acids and the impurities present in Steffen's filtrate or similar mixtures by converting the glutamic acid present in the raw material to pyrrolidone carboxylic acid as herein described and separating the amino acids and other impurities inherently present in the raw material from the pyrrolidone carboxylic acid.

Because of the physical and chemical properties of pyrrolidone carboxylic acid, it has been found to be easier to remove the other amino acids and the impurities inherently present in Steffen's filtrate from pyrrolidone carboxylic acid than from the glutamic acid. The instant invention utilizes a property of glutamic acid which distinguishes it from the other amino acids; namely, the property of transformation to its anhydride or lactam, pyrrolidone carboxylic acid. The physical and chemical properties of pyrrolidone carboxylic acid are materially different from those of glutamic acid. Like other amino acids, glutamic acid is amphoteric and is sorbed by cation exchange resins from solutions having a low pH. On the other hand, pyrrolidone carboxylic acid is not removed from a solution containing it by contacting the solution with the cation exchange resin. Also, when amino acids are heated in the presence of carbohydrate or carbohydrate-bearing material, the amino acids are partially destroyed, yielding insoluble material which can be separated from the solution. Pyrrolidone carboxylic acid is not destroyed when heated in the presence of carbohydrate material. By the term "carbohydrate material" as used herein is meant hexoses or pentoses or any polysaccharide yielding these upon acid hydrolysis, and includes carbohydrate-bearing material.

In practicing the instant novel process, the glutamic acid contained in solutions or mixtures is converted to pyrrolidone carboxylic acid by heating said solutions, such as concentrated Steffen's filtrate, at a pH of between about 4.0 and about 5.0 at a temperature of between about 100° C. and about 145° C. for between about 1.5 and about 16 hours. Solid material which forms during the period of heating is separated from the resulting mixture containing the pyrrolidone carboxylic acid. Additional amounts of the amino acid impurities are removed as insoluble material by adding carbohydrate or carbohydrate-bearing material to the mixture in which the glutamic acid has been converted to pyrrolidone carboxylic acid and heating the resulting mixture. After heating in the presence of carbohydrate material and diluting the resulting mixture to a dry solids content of between about 2% and about 20%, insoluble material is separated therefrom. Soluble impurities remaining in the resulting solution are separated from the pyrrolidone carboxylic acid by subjecting the mixture to ion exchange as hereindescribed. If the product which is desired is substantially pure glutamic acid, the purified solution containing pyrrolidone carboxylic acid is then subjected to hydrolysis, and glutamic acid is recovered from the resulting hydrolysate.

In practicing one embodiment of the instant novel process, the pH of concentrated Steffen's filtrate, having a dry solids content of between about 2% and about 60%, is adjusted to between about 4.1 and about 4.5 and heated at a temperature of between about 125° C. and about 140° C. for between about 2 and about 4 hours. A maximum conversion in the minimum of time is realized by adjusting the pH of the Steffen's filtrate to about 4.5 and heating for about 3 hours at a temperature of about 125° C.

When the Steffen's filtrate containing crude glutamic acid is heated, an equilibrium concentration ratio is approached which is dependent upon the pH of the aqueous mixture. For example, at a pH of about 7.0, the equilibrium concentration ratio of pyrrolidone carboxylic acid to glutamic acid in the mixture is about 98% to 2%, that is, of the total glutamic acid material, only about 2% is in the form of glutamic acid. At higher or lower pH's the equilibrium concentration ratio of pyrrolidone carboxylic acid to glutamic acid is lower. At a pH of about 3.2, about 92.5% of the glutamic acid exists in the form of pyrrolidone carboxylic acid. The rate of conversion of glutamic acid to pyrrolidone carboxylic acid when the mixture containing it is heated at a pH of about 7.0, is very slow, and equilibrium is established very slowly. At a pH of about 3.2, the rate of conversion is more rapid. In concentrated Steffen's filtrate, it has been found that at a pH of about 4.1, the equilibrium concentration of pyrrolidone carboxylic acid is about 97%. The rate of conversion of glutamic acid to pyrrolidone carboxylic acid is comparatively rapid at this pH.

It is important in practicing the instant novel process that the conversion of glutamic acid to pyrrolidone carboxylic acid be substantially complete because in subsequently removing impurities from the mixture by means of ion exchange, any unconverted glutamic acid will be sorbed by a cation exchanger. Rapid conversion of glutamic acid to pyrrolidone carboxylic acid is important for the reason that as long as glutamic acid remains in the form of glutamic acid, it is subject to the destructive action of heat, just as are the other amino acids. For this reason, a pH lower than about 4.0 is to be avoided during the conversion to pyrrolidone carboxylic acid by heating. Under the conditions employed in practicing the instant novel process for the conversion of glutamic acid to pyrrolidone carboxylic acid, considerable amounts of amino acids are destroyed, and a substantial percentage of non-nitrogenous impurities are converted into insoluble substances and are separated, for example, by filtration from the pyrrolidone carboxylic acid which is substantially stable to heat.

If the heating period is extended between about 3 and about 6 hours, about 50% of the amino acids and unknown quantities of other impurities in the mixture are converted to insoluble materials which may be removed from the mixture, for example, by filtration. Thus, the heating period may be prolonged to achieve removal of additional amounts of the impurities present in the crude mixture. Glutamic acid is protected from the destructive action of heat under these conditions because it is in the form of pyrrolidone carboxylic acid. After the conversion of glutamic acid to pyrrolidone carboxylic acid is substantially complete, carbohydrate material, such as starch, sucrose, glucose, molasses, or the like, is added to the resulting mixture and heating is continued.

When carbohydrate material is added to the mixture in which glutamic acid has been converted to pyrrolidone carboxylic acid or if carbohydrate material is already present in the feed material, the destruction and precipitation of the amino acids other than glutamic acid is increased. Preferably, the mixture which is heated contains between about 10 and about 20 grams total carbohydrate per 100 grams of concentrated Steffen's filtrate. Steffen's filtrate usually contains some carbohydrate material and usually between about 1 and about 10 grams of carbohydrate is added for each 100 grams of concentrated Steffen's filtrate. The resulting mixture is heated for between about 2 and about 10 hours. If smaller amounts of carbohydrate are present, the mixture should be heated for a longer period. Either before or following the heating period the mixture should be diluted to a dry solids content of between about 2% and about 20% because a portion of the organic material which is formed during the heating period is soluble in concentrated solution and precipitates upon dilution. The solid material is separated, for example, by filtration.

After the glumatic acid has been converted to pyrrolidone carboxylic acid and the solid impurities separated, the soluble impurities present are removed by subjecting the resulting solution to the action of ion exchangers as hereindescribed.

The solution, containing pyrrolidone carboxylic acid which is to be subjected to a cation exchange resin, is acidified with a mineral acid to a pH of about 3.2, and the solid material is then removed from the mixture. When the solution to be subjected to the cation exchange resin is treated in this maner, substantially no solid material is deposited on the cation exchange material.

The resulting solution of pyrrolidone carboxylic acid is contacted with a cation exchange resin operating on the hydrogen cycle. Synthetic resins available on the market having cation exchange properties and operating on the hydrogen cycle are suitable for use in the instant process. Among such resins that are suitable for use may be mentioned zeolite, sulfonated coals, phenol-formaldehyde resins containing sulfonic acid groups, etc. When practicing the instant process the speed or throughput of the pyrrolidone carboxylic acid solution through a bed or column of cation exchange resin is largely determined by the physical characteristics of the resin. In general, an intimate contact between the solution particles and the resin particles should be maintained and care should be taken to avoid, so far as possible, the channeling of the liquid through the resin body.

The cation exchange resin is kept on stream, that is the solution is passed over the resin, until it is substantially spent. This is determined by careful observation of the pH of the effluent from the operation. At first the pH markedly drops to a much lower level and remains at this substantially constant low value as long as the cations are being taken up. Once the pH of the effluent markedly rises, for example, above about 1.5, further throughput of the solution should be stopped. It will be at once apparent that in commercial operations a plurality of resin beds may be employed and may be connected in series so that a complete utilization of the ion exchanging capacity of each bed of resin is possible. In the following specific examples, the throughput of the solutions was stopped once a substantial portion of the resin body indicated a "break-through." Break-through of a resin is defined as that point at which it is considered to be saturated with respect to its ion exchange properties. In batch operations, this break-through may be characteristic of only a small portion of the resin, leaving still a substantial portion of the resin properly functioning. In commercial operations, a more complete utilization of the ion exchange properties is possible through a plurality of columns of resin interconnecting in series.

The spent or partially spent cation exchange resin, after placing the same off-stream, is washed with water, with the washings optionally being passed through the next batch or column of fresh cation resin. The washed resin may then be eluted with a suitable alkali, such as ammonium hydroxide. The eluate contains amino acids, betaine, and the like, but no pyrrolidone carboxylic acid since substantially none of this acid is sorbed on the cation exchange resin. The eluated resin is then regenerated in a conventional manner with a suitable strong mineral acid, such as hydrochloric acid or sulfuric acid, and placed on stream once again.

The effluent from the cation exchange resin contains the pyrrolidone carboxylic acid, as well as other acids. This acidic solution is then subjected to contact with an anion exchange resin to sorb the acids thereon. Suitable anion exchange resins which may be employed, but to which the invention is not limited, are phenolformaldehyde resins containing either aliphatic polyamines, aromatic polyamines, and/or containing guanidino radicals. The actual contacting or treatment of the solution with the anion resin is carried out in much the same manner as described with reference to the cation exchange resin, with the effluent being collected in commercial operation as long as the pH thereof remains substantially constant and does not drop below about 7.0, or at the lowest about 6.0. What has been said with reference to a plurality of resin beds and series operations, applies as well in connection with the application of the anion resin beds. Once the effluent begins to drop substantially below a pH of about 7.0, or at the lowest about 6.0, preferably about 6.5, the throughput is stopped, particularly in batch operation. The resin is washed with water, as in the case of the cation exchange resin, and the pyrrolidone carboxylic acid sorbed on the resin is eluted with either a strong mineral acid, such as hydrochloric acid, or with an aqueous ammonium hydroxide or sodium hydroxide solution. The specific type of eluting agent for the anion resin depends to a large extent upon the desired subsequent treatment of the material eluted. It is preferred to elute with an agent which not only removes the pyrrolidone carboxylic acid but also, at the same time, regenerates the anion resin. It is therefore preferred to employ aqueous sodium hydroxide or ammonium hydroxide solutions as the regenerating solution.

The eluate from the anion resin, in the form of the sodium hydroxide or ammonium hydroxide solution of pyrrolidone carboxylic acid may be hydrolyzed in the conventional manner, either through alkali or acid hydrolysis treatments, and glutamic acid recovered therefrom. The conversion of pyrrolidone carboxylic acid or its simple salts into glutamic acid or its simple salts is a conventional process and is not particularly to be considered a part of the instant invention, except insofar as the isolation and recovery of pyrrolidone carboxylic acid and its simple salts is concerned.

In another embodiment of the instant invention, the above described effluent from the cation exchange operation, which contains pyrrolidone carboxylic acid, can be subjected to hydrolysis to obtain glumatic acid. The hydrolysate is then subjected to a cation exchange resin which sorbs the glutamic acid. Glutamic acid is separated from the cation exchange resin by eluting the resin with alkali or strong mineral acid and is recovered from the resulting eluate.

In order to afford a fuller and more complete understanding of the invention, but with no intention of limiting the invention thereto, the following examples are given.

Example I

Concentrated Steffen's filtrate was adjusted to a pH of about 4.5 with concentrated sulfuric acid, and solid material was removed from the resulting mixture by filtration. The filtrate was diluted to about 6% dry substance and then was heated for about 3 hours at a temperature of about 125° C. To the resulting mixture was added about 10 grams of sucrose per 100 grams of concentrated Steffen's filtrate, and the resulting mixture was heated for about 6 hours. The resulting mixture was diluted to about 6% solids. Solid impurities were removed from the resulting mixture by filtration. The addition of glucose to the pyrrolidone carboxylic acid mixture and the additional heating results in the destruction of about 70% of the nonglutamic acid amino nitrogen.

Example II

Concentrated Steffen's filtrate was adjusted to a pH of about 4.5 with concentrated sulfuric acid, and the solid material was removed from the resulting mixture by filtration. The filtrate was diluted to about 6% dry substance and then was heated about three hours at a temperature of about 125° C. The resulting mixture was adjusted to pH 3.2 and filtered to remove flocculated impurities. The resulting filtrate was passed through a column packed with Duolite C-3 cation exchanger produced by Chemical Process Company and comprising sulfonated phenol-formaldehyde resins. The effluent was collected until the pH increased to about 1.0. The cation exchange column was then washed with water and eluted with about 4% aqueous ammonia. This elution with ammonia removed nitrogenous constituents adhering to the resin, i. e., amino acids and betaine, leaving undesirable inorganic compounds on the resin which were removed by regeneration with aqueous hydrochloric acid. The amino acids and betaine can be recovered from the eluate. The acid effluent, which contained pyrrolidone carboxylic acid, was adjusted to about pH 5.4 and evaporated to about 60% dry substance. To the concentrated material was added sodium hydroxide, and the resulting solution was heated at about 85° C. for about 2¼ hours to hydrolyze the pyrrolidone carboxylic acid to glutamic acid. Inorganic solids were removed from the concentrated solution by filtration. The pH of the filtrate was adjusted to about 3.2, and crude glutamic acid was crystallized therefrom. About 90% or more of organic impurities absorbable on a cation exchanger are removed by this method.

Example III

The pyrrolidone carboxylic acid mixture was prepared by the conversion of the glutamic acid in Steffen's filtrate and subjected to cation exchange material as described in Example II. The acid effluent from the cation exchange material was passed through a column packed with Duolite A-2 anion exchanger, produced by Chemical Process Company and comprising aminated phenol-formaldehyde resins, until the pH of the effluent dropped sharply below about 11, i. e., to about 6.5. The anion exchange material which sorbed the pyrrolidone carboxylic acid was eluted and simultaneously regenerated with sodium hydroxide. The purified pyrrolidone carboxylic acid was present in the eluate.

While the above described examples of the instant novel process disclose the method for the treatment of concentrated Steffen's filtrate, the instant novel process is clearly applicable to the hydrolysates of proteinaceous compositions, either animal or vegetable. Furthermore, it is not intended to limit the instant novel process to the procedural or operational details herein set forth, but obvious modifications and extensions thereof are deemed to be within the scope of the invention.

Having thus fully described the nature and character of the invention, what is desired to be secured by Letters Patent is:

1. A process of producing a purified pyrrolidone carboxylic acid solution which comprises adjusting the pH of a crude aqueous mixture containing glutamic acid, other amino acids, and inorganic impurities to between about 4 and about 5, heating the adjusted mixture at a temperature of between about 100° C. and about 145° C. for between about 1.5 and about 16 hours, adding between about 1% and about 10% carbohydrate material selected from the group consisting of hexoses, pentoses, polysaccharides, and materials yielding the same under the conditions obtaining to the pyrrolidone carboxylic acid-containing mixture, further heating the resulting mixture for between about 0.5 and about 10 hours, and separating solid material from the pyrrolidone carboxylic acid-containing solution.

2. A process which comprises adjusting the pH of concentrated Steffen's filtrate to between about 4 and about 5, separating solid material from the adjusted mixture, heating the solution from which solid material has been separated at a temperature between about 100° C. and about 145° C. for between about 1.5 and about 16 hours, adding between about 1% and about 10% carbohydrate material selected from the group consisting of hexoses, pentoses, polysaccharides, and materials yielding the same under the conditions obtaining to the pyrrolidone carboxylic acid-containing mixture, further heating the pyrrolidone carboxylic acid mixture for between about 0.5 and about 10 hours, separating solid material from the resulting mixture, contacting the resulting solution with a cation exchange material operating on the hydrogen cycle and collecting the pyrrolidone carboxylic acid-containing effluent therefrom.

3. A process which comprises adjusting the pH of the concentrated Steffen's filtrate raw material to a pH between about 4 and about 5, separating solid material from the adjusted mixture, diluting the resulting solution to a dry solids content of between about 2% and about 20%, heating the diluted mixture at a temperature between about 100° C. and about 145° C. for between about 1.5 and about 16 hours, adding between about 1% and about 10% of carbohydrate material selected from the group consisting of hexoses, pentoses, polysaccharides, and materials yielding the same under the conditions obtaining to the pyrrolidone carboxylic acid-containing mixture, further heating the pyrrolidone carboxylic acide mixture for between about ½ and about 10 hours, separating solid material from the resulting mixture, contacting the resulting solution with a cation exchange material operating on the hydrogen cycle, and collecting the pyrrolidone carboxylic acid-containing effluent therefrom.

4. A process which comprises adjusting the pH of an aqueous mixture containing glutamic acid, other amino acids and inorganic impurities to between about 4 and about 5, heating the adjusted mixture at a temperature of between about 100° C. and about 145° C. for between about 1.5 and about 16 hours, adding between about 1% and about 10% carbohydrate material selected from the group consisting of hexoses, pentoses, polysaccharides, and materials yielding the same under the conditions obtaining to the pyrrolidone carboxylic acid-containing mixture, further heating the pyrrolidone carboxylic acid mixture for between about ½ and about 10 hours, separating the solid material from the resulting mixture, contacting the resulting solution with a cation exchange material operating on the hydrogen cycle, contacting the effluent therefrom with an anion exchange material and eluting the pyrrolidone carboxylic acid from the anion exchange material.

5. A process which comprises adjusting the pH of concentrated Steffen's filtrate to between about 4 and about 5, separating solid material from the adjusted mixture, heating the solution from which solid material has been removed at a temperature between about 100° C. and about 145° C. for between about 1.5 and about 16 hours, adding between about 1 and about 10 lbs. of carbohydrate material selected from the group consisting of hexoses, pentoses, polysaccharides, and materials yielding the same under the conditions obtaining per 100 lbs. of the pyrrolidone carboxylic acid mixture, further heating the mixture for between about ½ and about 10 hours, diluting the resulting mixture to between about 2 and about 20% dry solids, separating solid material from the resulting mixture, contacting the resulting solution with a cation exchange material operating on the hydrogen cycle, contacting the effluent therefrom with anion exchange material, eluting the pyrrolidone carboxylic acid from the anion exchange material, hydrolyzing the pyrrolidone carboxylic acid in the eluate to glutamic acid, and recovering glutamic acid therefrom.

6. A process which comprises adding sufficient sulfuric acid to concentrated Steffen's filtrate in order to adjust the pH to between about 4 and about 5, separating solid material from the adjusted mixture, heating the solution from which the solid material has been separated at a temperature of between about 125° C. and about 130° C. for about 1½ hours, adding between about 1 pound and about 10 pounds of carbohydrate material selected from the group consisting of hexoses, pentoses, polysaccharides, and materials yielding the same under the conditions obtaining per 100 pounds to the pyrrolidone carboxylic acid mixture, further heating the resulting mixture for between about ½ and about 10 hours, diluting the resulting mixture to between about 2 and about 20% dry solids, separating solid material from the resulting mixture, contacting the resulting solution with a cation exchange material operating on the hydrogen cycle until the effluent therefrom has a pH no greater than about 1.5, contacting said effluent with an anion exchange material until the effluent therefrom has a pH of between about 6 and about 7 and eluting the pyrrolidone carboxylic acid from the anion exchange material.

7. A process which comprises adjusting the pH of a crude aqueous solution containing glutamic acid, other amino acids, between about one pound and about 20 pounds, per 100 pounds of solution, of a carbohydrate material selected from the group consisting of hexoses, pentoses, polysaccharides, and materials yielding the same under the conditions obtaining, and inorganic impurities to between about 4 and about 5, diluting the resulting solution to a dry solids content of between about 2% and about 20%, heating the resulting solution at a temperature between about 100° C. and about 145° C. until between about 2 hours and about 10 hours after the glutamic acid in the solution has been substantially completely converted to pyrrolidone carboxylic acid, separating solid material from the resulting reaction products, contacting the resulting solution with a cation exchange material operating on the hydrogen cycle, contacting the effluent therefrom with an anion exchange material, and eluting pyrrolidone carboxylic acid from the anion exchange material.

8. A process which comprises adjusting the pH of concentrated Steffen's filtrate to between about 4 and about 5, said Steffen's filtrate containing between about one pound and about 20 pounds, per 100 pounds of concentrated Steffen's filtrate, of a carbohydrate material selected from the group consisting of hexoses, pentoses, polysaccharides, and materials yielding the same under the conditions obtaining, separating solid material from the adjusted mixture, heating the resulting solution at a temperature between about 100° C. and about 145° C. until between about 2 hours and about 10 hours after the glutamic acid in the Steffen's filtrate has been substantially completely converted to pyrrolidone carboxylic acid, diluting the resulting mixture to between about 2% and about 20% dry solids content, separating solid material from the resulting mixture, contacting the resulting solution with a cation exchange material operating on the hydrogen cycle, contacting the effluent therefrom with an anion exchange material, eluting pyrrolidone carboxylic acid from the anion exchange material, and collecting a purified pyrrolidone carboxylic acid eluate.

9. A process which comprises adding sufficient sulfuric acid to concentrated Steffen's filtrate in order to adjust the pH to between about 4 and about 5, said Steffen's filtrate containing between about one pound and about 20 pounds, per 100 pounds of concentrated Steffen's filtrate, of a carbohydrate material selected from the group consisting of hexoses, pentoses, polysaccharides, and materials yielding the same under the conditions obtaining, separating solid material from the adjusted solution, heating the resulting solution at a temperature between about 100° C. and about 145° C. until between about 2 hours and about 10 hours after the glutamic acid in the Steffen's filtrate has been substantially completely converted to pyrrolidone carboxylic acid, diluting the resulting reaction product mixture to between about 2% and about 20% dry solids content, separating solid material from the resulting mixture, contacting the resulting solution with a cation exchange material operating on the hydrogen cycle, hydrolyzing the pyrrolidone carboxylic acid in the effluent to glutamic acid, contacting the resulting hydrolysate with a cation exchange material, eluting glutamic acid from the cation exchange material, and collecting a purified glutamic acid eluate.

10. A process which comprises adjusting the pH of concentrated Steffen's filtrate to between about 4 and about 5 with sulfuric acid, said Steffen's filtrate containing between about one pound and about 20 pounds, per 100 pounds of concentrated Steffen's filtrate, of a carbohydrate material selected from the group consisting of hexoses, pentoses, polysaccharides, and materials yielding the same under the conditions obtaining, separating solid material from the adjusted solution, diluting the solution from which solid material has been separated to about 5% solids content, heating the resulting solution at a temperature of between about 125° C. and about 130° C. until between about 3 hours and about 6 hours after the glutamic acid in the Steffen's filtrate has been substantially completely converted to pyrrolidone carboxylic acid, separating solid material from the resulting mixture, contacting the resulting solution with a cation exchange material operating on the hydrogen cycle, contacting the effluent therefrom with an anion exchange material, eluting pyrrolidone carboxylic acid from the anion exchange material, and collecting a purified pyrrolidone carboxylic acid eluate.

References Cited in the file of this patent

UNITED STATES PATENTS

| | | |
|---|---|---|
| 2,434,715 | Olcott et al. | Jan. 20, 1948 |
| 2,487,785 | Blish | Nov. 15, 1949 |
| 2,487,807 | Hoaglan | Nov. 15, 1949 |
| 2,510,980 | Jacobs et al. | June 13, 1950 |
| 2,528,047 | Fitch | Oct. 31, 1950 |

OTHER REFERENCES

Kibrick: J. Biol. Chem., vol. 174 (1948), pp. 845–49.
Karrer: Org. Chem., Elsevier Pub. Co., 3rd Ed.
Hackh's Chem. Dictionary, 3rd Ed., The Blakeston Co., Philadelphia.